US012628079B2

(12) United States Patent
   Botsinis et al.

(10) Patent No.: US 12,628,079 B2
(45) Date of Patent: May 12, 2026

(54) LOW-POWER DISTRIBUTED COMPUTING

(71) Applicant: Apple Inc., Cupertino, CA (US)

(72) Inventors: Panagiotis Botsinis, Munich (DE);
   Amr Abdelrahman Yousef
   Abdelrahman Mostafa, Munich (DE);
   Christian Hofmann, Munich (DE);
   Said Medjkouh, San Diego, CA (US);
   Sameh M. Eldessoki, Munich (DE);
   Tarik Tabet, Carlsbad, CA (US)

(73) Assignee: Apple Inc., Cupertino, CA (US)

( * ) Notice: Subject to any disclaimer, the term of this
   patent is extended or adjusted under 35
   U.S.C. 154(b) by 341 days.

(21) Appl. No.: 18/532,987

(22) Filed: Dec. 7, 2023

(65) Prior Publication Data

US 2024/0196324 A1     Jun. 13, 2024

(30) Foreign Application Priority Data

Dec. 9, 2022     (GR) .............................. 20220101022

(51) Int. Cl.
   *H04W 52/02*     (2009.01)
   *H04L 1/1812*     (2023.01)
   *H04W 72/1273*     (2023.01)
(52) U.S. Cl.
   CPC ....... *H04W 52/0216* (2013.01); *H04L 1/1812*
   (2013.01); *H04W 52/0235* (2013.01); *H04W*
   *72/1273* (2013.01)
(58) Field of Classification Search
   CPC ... G06F 2209/509; H04L 1/08; H04L 1/1812;

H04L 1/1864; H04L 67/10–1038; H04L
67/1095; H04W 24/02; H04W 28/0268;
H04W 28/084; H04W 52/0216; H04W
52/0229; H04W 52/0235; H04W 52/0251;
H04W 52/0258; H04W 72/0446; H04W
72/1273; H04W 72/21; H04W 74/006;
H04W 76/27; H04W 76/28; Y02D 10/00;
Y02D 30/70
See application file for complete search history.

(56) References Cited

U.S. PATENT DOCUMENTS

| | | | | |
|---|---|---|---|---|
| 2018/0183855 | A1* | 6/2018 | Sabella | ................... H04L 67/04 |
| 2019/0364492 | A1* | 11/2019 | Azizi | ................ H04W 52/0264 |
| 2024/0064630 | A1* | 2/2024 | Abotabl | ............ H04W 52/0216 |
| 2025/0220639 | A1* | 7/2025 | Elshafie | .............. H04W 72/231 |

* cited by examiner

*Primary Examiner* — Thomas R Cairns
(74) *Attorney, Agent, or Firm* — Fish & Richardson P.C.

(57) ABSTRACT

A processor has circuitry that executes instructions to cause a user equipment (UE) to perform operations. The operations include determining to offload a task to a network node. The operations include transmitting an offload request to the network node, wherein the offload request comprises a size of an expected response and a latest receipt time. The operations include determining a wakeup time that is earlier than the latest receipt time. The operations include entering a power-saving mode until the wakeup time. The operations include exiting the power-saving mode at the wakeup time. The operations include monitoring a communication channel for the expected response from the network node until the latest receipt time. Also disclosed are a UE and a method.

20 Claims, 9 Drawing Sheets

400A

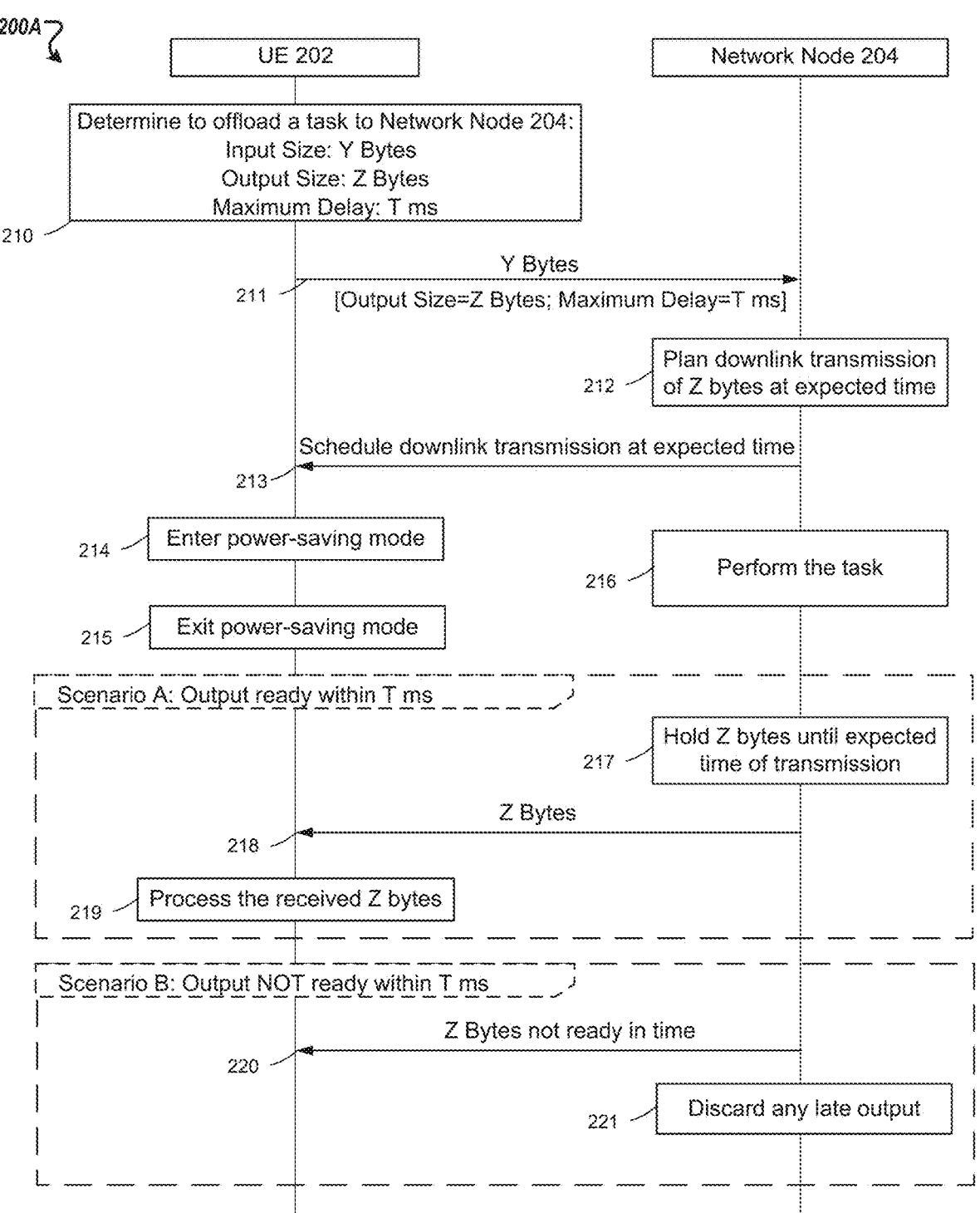

200A

UE 202

Network Node 204

210
Determine to offload a task to Network Node 204:
Input Size: Y Bytes
Output Size: Z Bytes
Maximum Delay: T ms 211
Y Bytes
[Output Size=Z Bytes; Maximum Delay=T ms]

212
Plan downlink transmission
of Z bytes at expected time

213
Schedule downlink transmission at expected time

214
Enter power-saving mode

216
Perform the task

215
Exit power-saving mode

Scenario A: Output ready within T ms

217
Hold Z bytes until expected
time of transmission

218
Z Bytes

219
Process the received Z bytes

Scenario B: Output NOT ready within T ms

220
Z Bytes not ready in time

221
Discard any late output

FIG. 2A

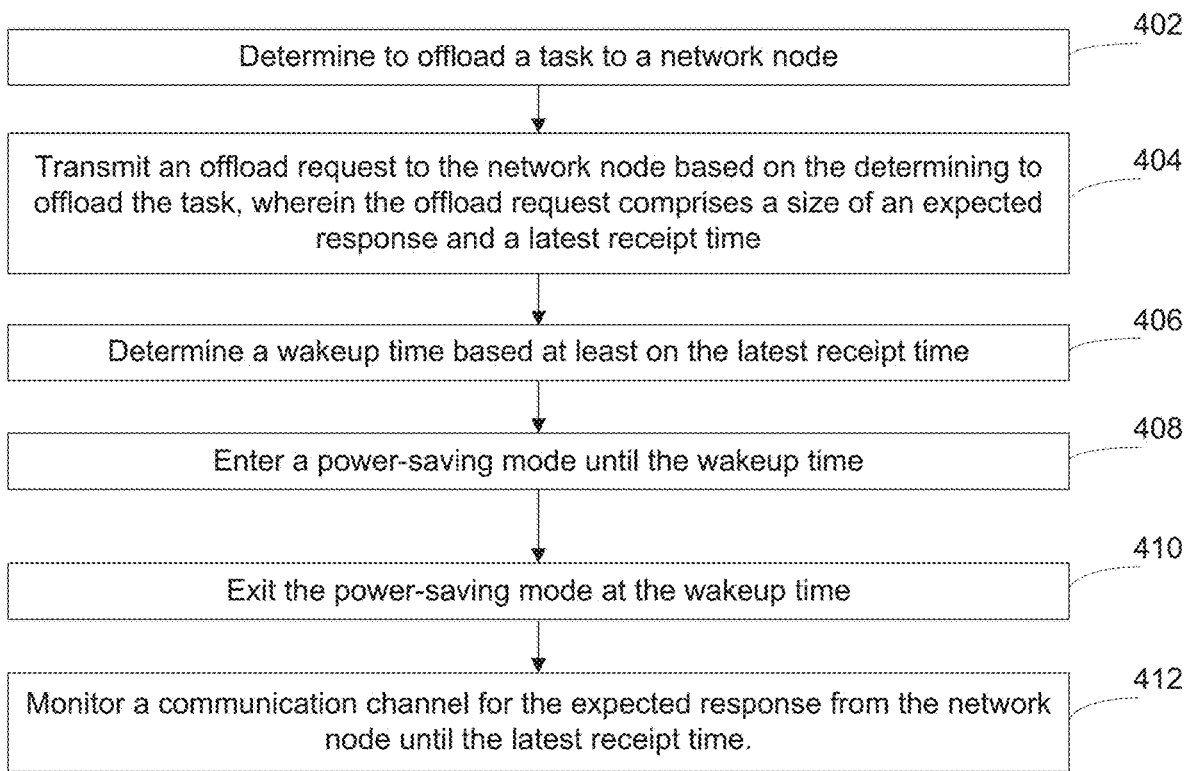

| | |
|---|---|
| Determine to offload a task to a network node | 402 |
| Transmit an offload request to the network node based on the determining to offload the task, wherein the offload request comprises a size of an expected response and a latest receipt time | 404 |
| Determine a wakeup time based at least on the latest receipt time | 406 |
| Enter a power-saving mode until the wakeup time | 408 |
| Exit the power-saving mode at the wakeup time | 410 |
| Monitor a communication channel for the expected response from the network node until the latest receipt time. | 412 |

422 Receive a request to offload a task from a UE

424 Determine, from the request, a size of an expected response and a latest receipt time 426 Attempt to obtain the expected response 428 Expected response ready in time?

YES NO

430 Transmit the expected response to the UE

432 Stop performing the task and/ or discard any late response

LOW-POWER DISTRIBUTED COMPUTING

CROSS-REFERENCE TO RELATED APPLICATIONS

This application claims priority to Greek Patent Application No. 20220101022, filed on Dec. 9, 2022, the content of which is incorporated herein by reference.

BACKGROUND

Wireless communication networks provide integrated communication platforms and telecommunication services to wireless user devices. Example telecommunication services include telephony, data (e.g., voice, audio, and/or video data), messaging, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

When a user device, such as a user equipment (UE), establishes connection with an access node, the user device can perform Mobile Terminated (MT) communication with the access node. MT communication generally refers to communication received by and terminating at a mobile terminal. In order for the user device to remain reachable in MT communication, the user device is typically configured to regularly monitor certain communication channels, thereby consuming power.

SUMMARY

In accordance with one aspect of the present disclosure, a processor has circuitry that executes instructions to cause a UE to perform operations. The operations include determining to offload a task to a network node. The operations include transmitting an offload request to the network node based on the determining to offload the task, wherein the offload request includes a size of an expected response and a latest receipt time. The operations include determining a wakeup time based at least on the latest receipt time. The operations include entering a power-saving mode until the wakeup time. The operations include exiting the power-saving mode at the wakeup time. The operations include monitoring a communication channel for the expected response from the network node until the latest receipt time.

In some implementations, determining the wakeup time includes: prior to entering the power-saving mode, receiving a scheduling signal from the network node, wherein the scheduling signal indicates an expected time for the network node to transmit the expected response; and determining the wakeup time based at least on the expected time.

In some implementations, determining the wakeup time includes: estimating an expected time for the network node to transmit the expected response; and determining the wakeup time based at least on the expected time. Further, monitoring the communication channel for the expected response includes: transmitting a request for the expected response to the network node.

In some implementations, the offload request includes a medium access control (MAC) control element (CE).

In some implementations, the operations further include transmitting, via radio resource control (RRC) signaling, a list of multiple tasks. Further, the offload request includes an identifier that identifies the task from the list.

In some implementations, the task is a first task. The operations further include: determining to offload a second task in the list to the network node; and multiplexing the offloading of the first task and the offloading of the second task in a frequency domain or in a time domain.

In some implementations, the operations further include receiving the expected response from the network node; and executing an application using the expected response.

In some implementations, the UE is configured to not monitor the communication channel while in the power-saving mode.

In accordance with one aspect of the present disclosure, a UE includes a processor and a transceiver coupled to the processor. The processor is configured to generate an offload request to a network node after determining to offload a task to the network node. The offload request includes: a size of an expected response and a latest receipt time for the expected response. The processor is configured to determine a wakeup time based at least on the latest receipt time. The processor is configured to enter a power-saving mode until the wakeup time and exit the power-saving mode at the wakeup time. The processor is configured to control the transceiver to monitor a communication channel for the expected response from the network node until the latest receipt time. The transceiver is configured to transmit the offload request to the network node.

In some implementations, the transceiver receives, prior to the processor entering the power-saving mode, a scheduling signal from the network node. The scheduling signal indicates an expected time for the network node to transmit the expected response. The processor determines the wakeup time based at least on the expected time.

In some implementations, the processor estimates an expected time for the network node to transmit the expected response. The processor determines the wakeup time based at least on the expected time. The transceiver transmits to the network node a request for the expected response.

In some implementations, the offload request includes a medium access control (MAC) control element (CE).

In some implementations, the transceiver transmits, via RRC signaling, a list of multiple tasks. The offload request further includes an identifier that identifies the task from the list.

In some implementations, the processor further determines to offload a second task in the list to the network node. The processor multiplexes the offloading of the task and the offloading of the second task in a frequency domain or in a time domain.

In some implementations, the transceiver is configured to not monitor the communication channel while in the power-saving mode.

In accordance with one aspect of the present disclosure, a method performed by a UE includes determining to offload a task to a network node. The method includes transmitting an offload request to the network node based on the determining to offload the task, wherein the offload request includes a size of an expected response and a latest receipt time. The method includes determining a wakeup time based at least on the latest receipt time. The method includes entering a power-saving mode until the wakeup time. The method includes exiting the power-saving mode at the wakeup time. The method includes monitoring a communication channel for the expected response from the network node until the latest receipt time.

In some implementations, the method further includes, upon detecting that the latest receipt time has passed, entering the power-saving mode.

In some implementations, the offload request further includes a number of hybrid automatic repeat request (HARQ) retransmissions. The method includes, before the latest receipt time, receiving the expected response from the network node via the number of HARQ retransmissions.

In some implementations, the method further includes receiving the expected response using a downlink resource determined by configured scheduling.

In some implementations, the method further includes receiving the expected response using a downlink resource determined by dynamic scheduling.

The details of one or more implementations of these systems and methods are set forth in the accompanying drawings and the description below. Other features, objects, and advantages of these systems and methods will be apparent from the description and drawings, and from the claims.

BRIEF DESCRIPTION OF THE FIGURES

FIGS. 2A-2C each illustrate a communications flow of distributed computing, according to some implementations.

FIGS. 4A and 4B each illustrate a flowchart of an example method, according to some implementations.

DETAILED DESCRIPTION

When a UE performs a task, such as a complex computation, the UE may decide to offload the task to a node in the communication network ("network node" hereinafter), such as a base station, that has more resources for the task. When the network node completes the task, the network node transmits the result back to the UE in the format and within the timeframe desired by the UE. This mechanism, referred to as distributed computing, helps improve the efficiency of resource utilization across the network.

In order for the UE to properly receive the computation results from the network node, the UE needs to monitor the channel at the time when the network node transmits the results over the channel. If the transmission is an MT communication initiated by the network node, then it is difficult for the UE to know the exact time of transmission. Thus, the UE may need to actively monitor the channel for an extended period even though the transmission may only take a short moment. Such monitoring can be very power-consuming.

In order to save power when the UE offloads a task to a network node, it is desirable to reduce the time when the UE actively monitors the channel. Accordingly, implementations of this disclosure provide a mechanism that allows the UE to initiate the communication from the network node. As described in detail below, the UE can send an offload request to the network node, enter a power-saving node by not monitoring the channel until an estimated wakeup time, and then wake up to monitor the channel for a reduced period of time. As such, the UE can reduce power consumption caused by monitoring the channel for the computation results.

Figure 1:
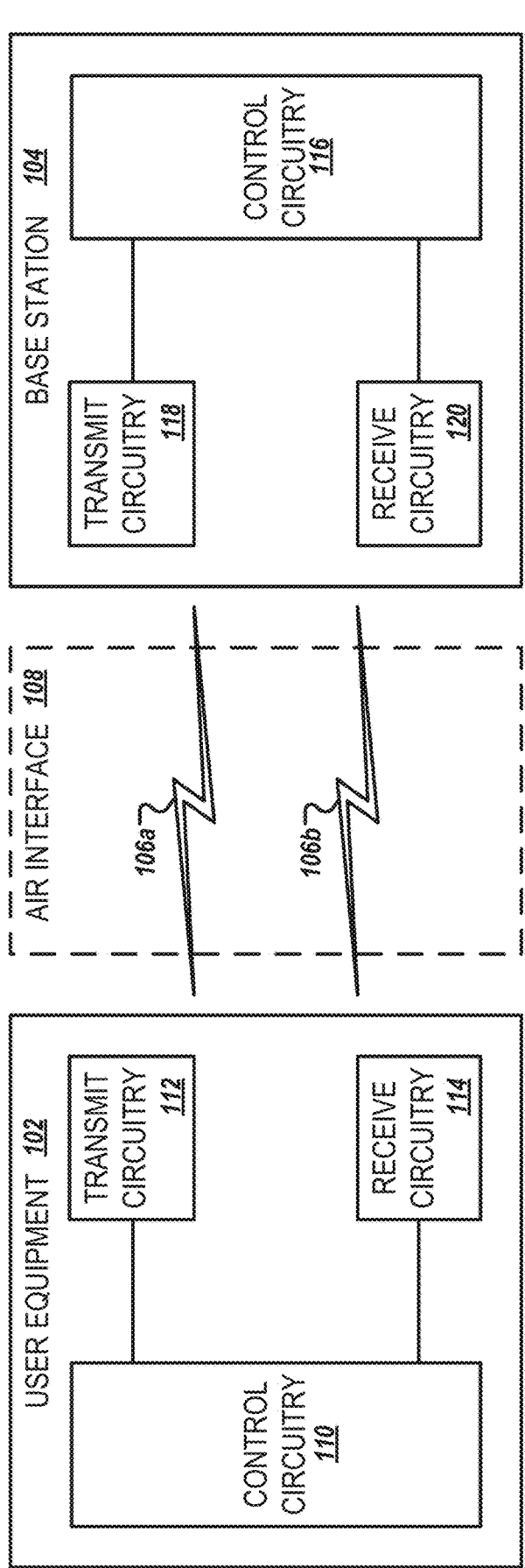
FIG. 1 illustrates a wireless network, according to some implementations.

FIG. 1 illustrates a wireless network 100, according to some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104. In distributed computing where UE 102 offloads a task to base station 104, channels 106A and 106B can include a PDCCH if UE 102 is in a Connected mode, or a Paging channel if UE 202 is in an Idle mode. UE 102 can use channels 106A or 106B to send an offload request to base station 104. Correspondingly, base station 104 can use channels 106A or 106B to schedule transmission of responses to the offload request. Additionally or alternatively, channels 106A and 106B can include a physical downlink shared channel (PDSCH). Base station 104 can use channels 106A or 106B to transmit one or more transport blocks that contain the responses to the offload request. When UE 102 is not in power saving mode, UE 102 can have wireless communication functions turned on such that UE 102 actively monitors one or more of channels 106A and 106B.

In some implementations, the wireless network 100 may be a Non-Standalone (NSA) network that incorporates Long Term Evolution (LTE) and Fifth Generation (5G) New Radio (NR) communication standards as defined by the Third Generation Partnership Project (3GPP) technical specifications. For example, the wireless network 100 may be a E-UTRA (Evolved Universal Terrestrial Radio Access)-NR Dual Connectivity (EN-DC) network, or an NR-EUTRA Dual Connectivity (NE-DC) network. In some other implementations, the wireless network 100 may be a Standalone (SA) network that incorporates only 5G NR. Furthermore, other types of communication standards are possible, including future 3GPP systems (e.g., Sixth Generation (6G)), Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, any of laptop computers, smartphones, tablet computers, machine-type devices such as smart meters or specialized devices for healthcare, intelligent transportation systems, or any other wireless device. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by one or more antennas integrated with the base station 104. The service areas can be divided into a number of sectors associated with one or more particular antennas. Such sectors may be physically associated with one or more fixed antennas or may be assigned to a physical area with one or more tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry and/or front-end module (FEM) circuitry.

In various implementations, aspects of the transmit circuitry 112, receive circuitry 114, and control circuitry 110 may be integrated in various ways to implement the operations described herein. The control circuitry 110 may be adapted or configured to perform various operations such as those described elsewhere in this disclosure related to a UE. For instance, the control circuitry 110 can control whether UE 102 enters a power-saving mode, determine whether UE 102 should offload the task or perform the task on its own, and process the output received from the network node (e.g., base station 104) that has completed the task.

The transmit circuitry 112 can perform various operations described in this specification. For example, the transmit circuitry 112 can transmit an offload request to the network node. Additionally, the transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108.

The receive circuitry 114 can perform various operations described in this specification. For instance, the receive circuitry 114 can monitor the communication channel and receive the results of the task when the network node has completed performing the task. Additionally, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In some implementations, the base station 104 may be a 5G radio access network (RAN), a next generation RAN, a E-UTRAN, a non-terrestrial cell, or a legacy RAN, such as a UTRAN. As used herein, the term "5G RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any UE connected to the base station 104. The receive circuitry 120 may receive a plurality of uplink physical channels from one or more UEs, including the UE 102.

In FIG. 1, the one or more channels 106A, 106B are illustrated as an air interface to enable communicative coupling, and can be consistent with cellular communications protocols, such as a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any other communications protocol(s). In implementations, the UE 102 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Discovery Channel (PSDCH), and a Physical Sidelink Broadcast Channel (PSBCH).

Figure 2B:
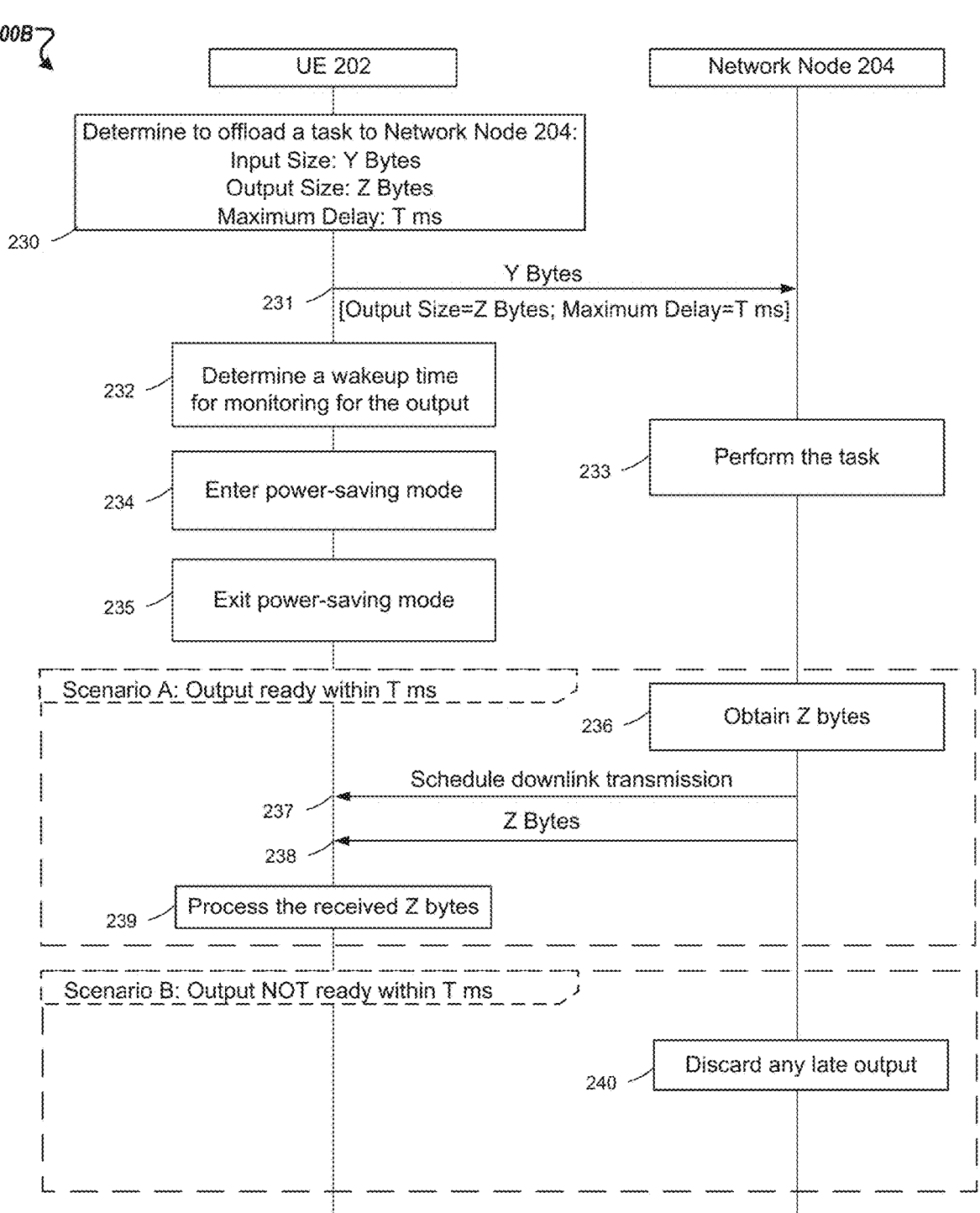
Figure 2C:
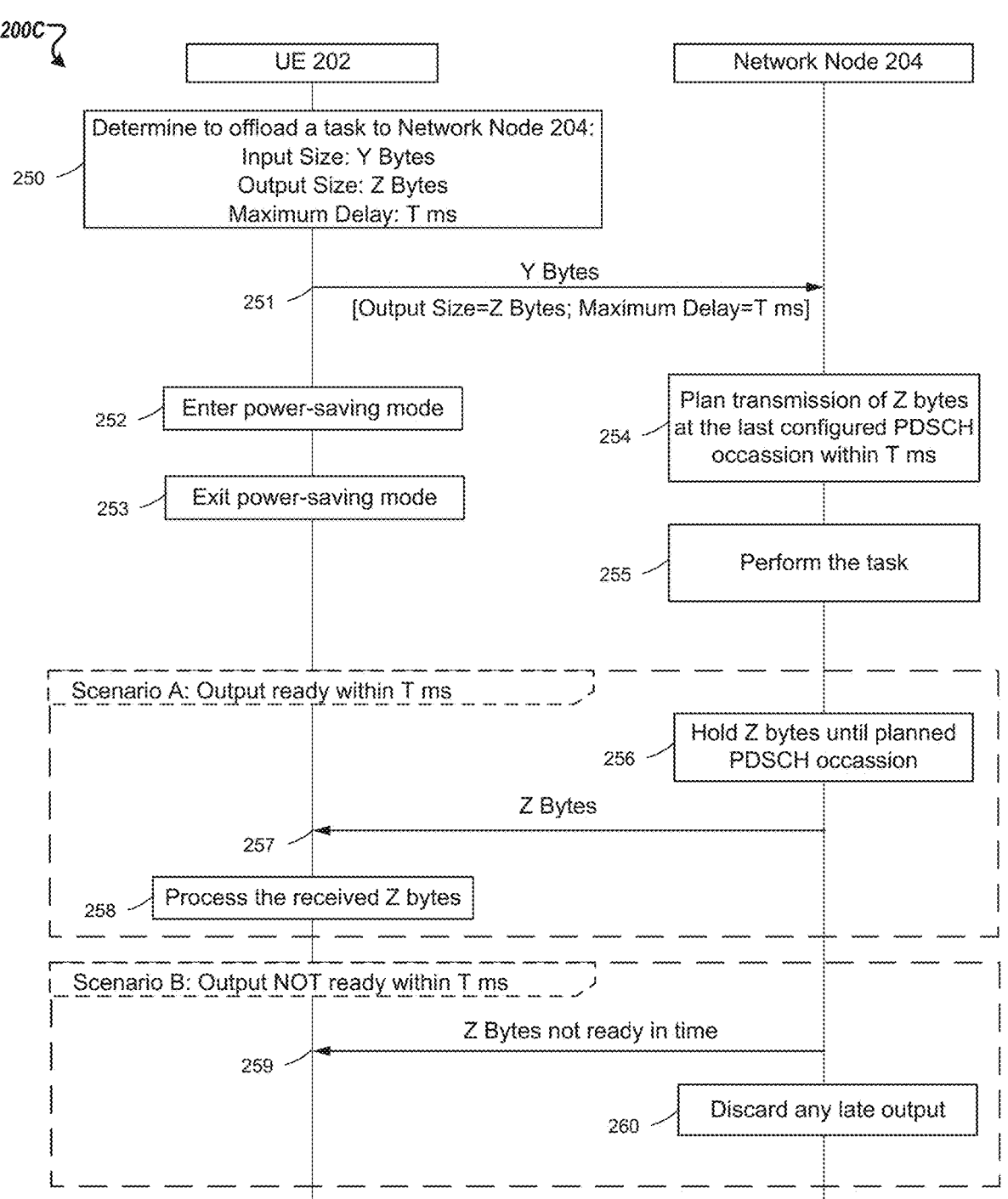

FIGS. 2A-2C each illustrate a communications flow, 200A-200C, respectively, of distributed computing, according to some implementations. In FIGS. 2A-2C, UE 202 and network node 204 can be similar to UE 102 and base station 104, respectively, of FIG. 1. Communications flows 200A-200C are similar in that network node 204 may transmit the output of the offloaded task (e.g., computation results) without an express request from UE 202 to retrieve the output. However, communications flows 200A-200C differ in downlink scheduling mechanisms and timing.

In FIG. 2A, at 210, UE 202 determines to offload a task to network node 204. When multiple network nodes are available, UE 202 can select network node 204 from those available based on criteria such as the nature of the task, the computation resources at each network node, or the communication quality between UE 202 and each network node. In some implementations, UE 202 makes the determination while in a power-saving mode, e.g., with certain wireless communication functions turned off.

From the determination at 210, UE 202 obtains knowledge about the input of the task, the output of the task, and/or the timing constraints for performing the task. For example, UE 202 can obtain Y bytes of data that are input variables to the task. The content and/or format of the Y bytes of input can be either pre-agreed on or determined in an ad-hoc manner between UE 202 and network node 204. Also, UE 202 can expect to receive at least Z bytes as the output of the task. In addition, UE 202 can decide that it must receive the output no later than a maximum delay of T milliseconds (ms).

At 211, UE 202 sends the information from the determination of 210 to network node 204. For example, UE 202 can send the Y bytes of input data, the size of the expected response (Z bytes of output data), and the latest time for receiving the response (T ms after the determination at 210) to network node 204. UE 202 can send these information items in an offload request that specifies the task. The offload request can be formed to include, e.g., a MAC CE that provides the Y bytes, the output size Z, and/or the maximum delay T. In implementations where UE 202 is in the power-saving mode while making the determination at 210, UE 202 exits the power-saving mode before sending the information to network node 204 at 211.

In some implementations, UE 202 has multiple candidate tasks for potentially offloading to network node 204. To do so, UE 202 can transmit a list of the offloading candidate tasks to network node 204 via, e.g., RRC signaling. To specify which candidate task(s) to offload, UE 202 can include within the offload request an identifier of each offloaded task, as well as the input data, expected output size, and the maximum delay corresponding to each off-loaded task. When the offload request identifies multiple tasks, UE 202 can multiplex the offload request in a fre-quency domain or in a time domain to improve transmission throughput. To increase the time UE 202 spends in the power-saving mode, UE 202 can multiplex the offload request while specifying that the multiple tasks are offloaded at substantially the same time and/or the outputs of the multiple tasks are received at substantially the same time.

At 212, upon receiving the offload request from UE 202, network node 204 plans downlink transmission of the output data. For example, network node 204 can estimate a time it needs for performing the task based on factors such as availability of computing resources, the complexity of the task, the expected size of output data, and the timing constraint. Based on the estimate, network node 204 can obtain an expected time for transmitting the output data to UE 202. The expected time is typically slightly earlier than the maximum delay T specified by UE 202 to allow for wireless transmission.

At 213, network node 204 transmits a scheduling signal to inform UE 202 of the expected time of transmitting the output. The scheduling signal can indicate, e.g., the time and/or frequency resources used in the expected downlink transmission, as well as the modulation coding scheme (MCS) of the transmission. The scheduling signal can also serve as an acknowledgement of the offload request received at 211. In some implementations, network node 204 is configured to send the scheduling signal as soon as it determines the expected time so UE 202 can be notified of the expected time of downlink transmission early. This can increase the time UE 202 spends in the power-saving mode, as described below, thereby reducing power consumption.

At 214, upon receiving the scheduling signal, UE 202 knows that the output will not be ready until the expected time. Thus, UE 202 enters a power-saving mode, such as a sleep mode. In the power-saving mode, UE 202 is config-ured not to monitor a communications channel (e.g., PDCCH or Paging channel) with network node 204, thereby saving power.

At 215, UE 202 exits the power saving mode at a wakeup time. The wakeup time can be the same as the expected time provided by network node 204, or can be slightly earlier than the expected time to allow for sufficient time to start monitoring the communications channel. Upon wakeup, UE 202 continuously monitors the communications channel, expecting to receive a response from network node 204 with the output.

In the meantime, at 216, network node 204 starts per-forming the task after transmitting the scheduling signal at 213. In some implementations, network node 204 performs the task by carrying out the computing itself and directly obtains the output from the computing. In some implemen-tations, network node 204 performs the task by outsourcing the task to another computing device, such as a cloud server, and obtains the output from the computing device. Whether network node 204 outsources the computing or not, network node 204 attempts to obtain the output according to the plan at 212. Network node 204 can use a timer to keep track of the time spent on performing the task.

In normal conditions, network node 204 is capable of completing the task and obtaining the output on time, i.e., by the expected time. However, due to unexpected factors, such as network congestion, inaccurate estimation of the expected time, or interrupted communication, network node 204 is unable to obtain the output in time. The two scenarios are separately illustrated in communications flow 200A.

In Scenario A, network node 204 obtains the output in time as expected and can provide the output to UE 202 within the maximum delay T ms. In this scenario, at 217, network node 204 holds the obtained Z bytes of output until the expected time.

At 218, network node 204 transmits the Z bytes of output to UE 202 at the expected time, as scheduled. In some implementations, network node 204 is configured to support transmitting the Z bytes multiple times, utilizing a mecha-nism such as HARQ retransmission, to ensure UE 202 receives the Z bytes. For example, network node 204 can transmit the HARQ retransmissions multiple times accord-ing to a number provided by UE 202 in the offload request. Network node 204 stops the transmission when the maxi-mum delay T ms has passed.

At 219, upon timely receiving the Z bytes of output, UE 202 processes the output by, e.g., inspecting the validity of the output, using the output to execute an application, or starting another offloading using the Z bytes as input.

In Scenario B, network node 204 does not timely obtain the output and thus cannot provide the output to UE 202 within the maximum delay T ms. As such, at 220, network node 204 can expressly inform UE 202 of the failure of timely completing the task. Alternatively, network node 204 can keep silent without sending an express notice of task failure. Upon learning of the task failure, UE 202 can perform the task on its own or make another offload attempt to network node 204 or another available node.

At 221, for any task output that comes out late, network node 204 can discard the output.

In communications flow 200A described above, because network node 204 is made aware of the size of the expected output and the latest time by which UE 202 needs the output, network node 204 can plan the performance of the task ahead of time. Accordingly, network node 204 can schedule the transmission of the output with UE 202 early in the offloading procedure, even before performing the task. As such, UE 202 does not need to keep monitoring the com-munications channel throughout the offloading procedure but only during a shorter period after waking up. The reduced monitoring time can advantageously reduce power consumption by UE 202.

In FIG. 2B, communications flow 200B is similar to communications flow 200A of FIG. 2A. However, a major difference in communications flow 200B from 200A is that UE 202 enters the power-saving mode prior to receiving the scheduling signal from network node 204. Before entering the power-saving mode, UE 202 estimates the time for network node 204 to perform the task. Based on its own estimate, UE 202 determines the wakeup time and exits the power-saving mode at the wakeup time to monitor the communications channel.

Specifically, at 230 and 231 of FIG. 2B, UE 202 deter-mines to offload a task to network node 204 and transmits an offload request to network node 204. Similar to 210 and 211 of communications flow 200A, UE 202 can include within the offload request information, such as Y bytes of input data, the expected output size of Z bytes, and the maximum delay of T ms.

At 232, after transmitting the offload request, UE 202 determines the wakeup time based on, e.g., an estimated time for network node 204 to perform the task. Assuming network node 204 will not obtain and transmit the output before the wakeup time, UE 202 enters the power-saving mode at 234 and exists the power-saving mode at 235. To facilitate the determination of the wakeup time, UE 202 and network node 204 can agree on a parameter that controls the timing of the transmission of the output. For example, apart from notifying network node 204 of the maximum delay of T ms, UE 202 can provide a parameter τ to network node 204, where T-τ represents the earliest possible time network node 204 may transmit the output. That is, UE 202 can require network node 204 to withhold any available output until T-τ. As such, UE 202 can determine the wakeup time to be no earlier than T-τ. This can prevent UE 202 from unnecessarily waking up early.

Meanwhile, after receiving the offload request, network node 204 performs the task at 233 without planning/scheduling the downlink transmission first. Similar to 216 of communications flow 200A, network node 204 in communications flow 200B can perform the task either by using its own computing resources or by outsourcing the task to another computing device. Depending on whether network node 204 timely obtains the output, communications flow 200B has two scenarios.

In Scenario A, network node 204 obtains the output in time as expected at 236 and can provide the output to UE 202 within the maximum delay T ms. In this scenario, network node 204 schedules the downlink transmission at 237 by sending a scheduling signal to UE 202 upon obtaining the output. The transmission of the scheduling signal at 237 can be similar to the transmission at 213 of communications flow 200A, although the two transmissions occur at different times in the communications flows. Because UE 202 has already exited the power-saving mode and is monitoring the communications channel at this time, UE 202 can detect the scheduling signal and be prepared to receive the upcoming output data.

At 238, following the transmission of the scheduling signal, network node 204 transmits the Z bytes of obtained output data to UE 202 at 238. Similar to 218 of communications flow 200A, network node 204 can transmit the output data multiple times before the lapse of T ms.

At 239, upon timely receiving the Z bytes of output, UE 202 processes the output similarly to 219.

In Scenario B, network node 204 does not timely obtain the output and thus cannot provide the output to UE 202 within the maximum delay T ms. As such, network node 204 does not schedule the downlink transmission. Similar to 221 of communications flow 200A, network node 204 can discard any late output.

In both communications flows 200A and 200B, the downlink transmissions of output data are dynamically scheduled given that (i) the transmissions are not scheduled at pre-configured occasions and (ii) the downlink transmission resources are dynamically allocated. For example, when network node 204 schedules downlink transmission at 213 or 237, network node 204 can transmit downlink control information (DCI) messages with downlink grant on planned PDCCH resources to inform UE 202 of the scheduled transmission.

In contrast to dynamic scheduling in communications flows 200A and 200B, the scheduling of downlink transmission in communications flow 200C of FIG. 2C is configured scheduling, i.e., based on pre-configured resources. The pre-configured resources in configured scheduling can be, e.g., periodic PDSCH occasions determined when UE 202 and network node 204 establishes a communication session. Under this mechanism, UE 202 and network node 204 can be pre-configured to agree that the output will be transmitted on certain PDSCH occasions in one or more transport blocks depending on the size Z of the output. UE 202 and network node 204 can also be pre-configured to agree on parameters, such as MCS, number of layers, and periodicity of the PDSCH occasions. Communications flow 200C is described in detail below.

In FIG. 2C, similar to communications flows 200A and 200B, communications flow 200C begins with UE 202 determining to offload a task to network node 204 at 250 and transmitting an offload request to network node 204 at 251.

Upon receiving the offload request, network node 204 plans the downlink transmission of Z bytes of output at 254. Different from dynamic scheduling in communications flows 200A and 200B, here in 200C network node 204 can plan the downlink transmission to occur at the last configured PDSCH occasion before the lapse of T ms. In other words, because communications flow 200C uses configured scheduling to pre-configure a series of occasions with PDSCH transmission resources, network node 204 can schedule the downlink transmission of the Z bytes to occur at the last available PDSCH occasion before the lapse of T ms. After the scheduling, network node 204 can perform the task at 255, without sending a scheduling signal to UE 202.

On the UE 202 side, UE 202 enters the power-saving mode at 252 and exits the power-saving mode at a wakeup time at 253. Because UE 202 is aware that network node 204 uses configured scheduling to plan transmission, UE 202 can wake up at a time slightly earlier than the last available PDSCH occasion before the lapse of T ms. As such, UE 202 does not need to be expressly informed of the scheduled downlink transmission time. This mechanism of configured scheduling is different from dynamic scheduling where network node 204 sends a scheduling signal to UE 202 to indicate the time of scheduled transmission.

Similar to communications flows 200A and 200B, communications flow 200C addresses two scenarios depending on whether network node 204 obtains the output in time. In Scenario A, network node 204 obtains the output in time as expected and can provide the output to UE 202 within the maximum delay T ms. Thus, at 256, network node 204 holds the obtained Z bytes of output until the time of scheduled transmission (i.e., the last available PDSCH occasion before the lapse of T ms). At 257, network node 204 transmits the Z bytes of output to UE 202 at the scheduled PDSCH occasion. At 258, UE 202 processes the output. 256-258 of communications flow 200C can be similar to 217-219 of communications flow 200A.

In Scenario B, network node 204 does not timely obtain the output and thus cannot provide the output to UE 202 within the maximum delay T ms. Communications flow 200C can address this scenario similarly to Scenario B of communications flow 200A.

In communications flows 200A-200C, UE 202 exits the power-saving mode and waits for network node 204 to transmit, or "push," the output at the scheduled time. Different from this "push" mechanism, communications flow 300 of FIG. 3, described next, is based on a "pull" mechanism in which UE 302 expressly requests to retrieve the output data upon exiting the power-saving mode.

Figure 3:
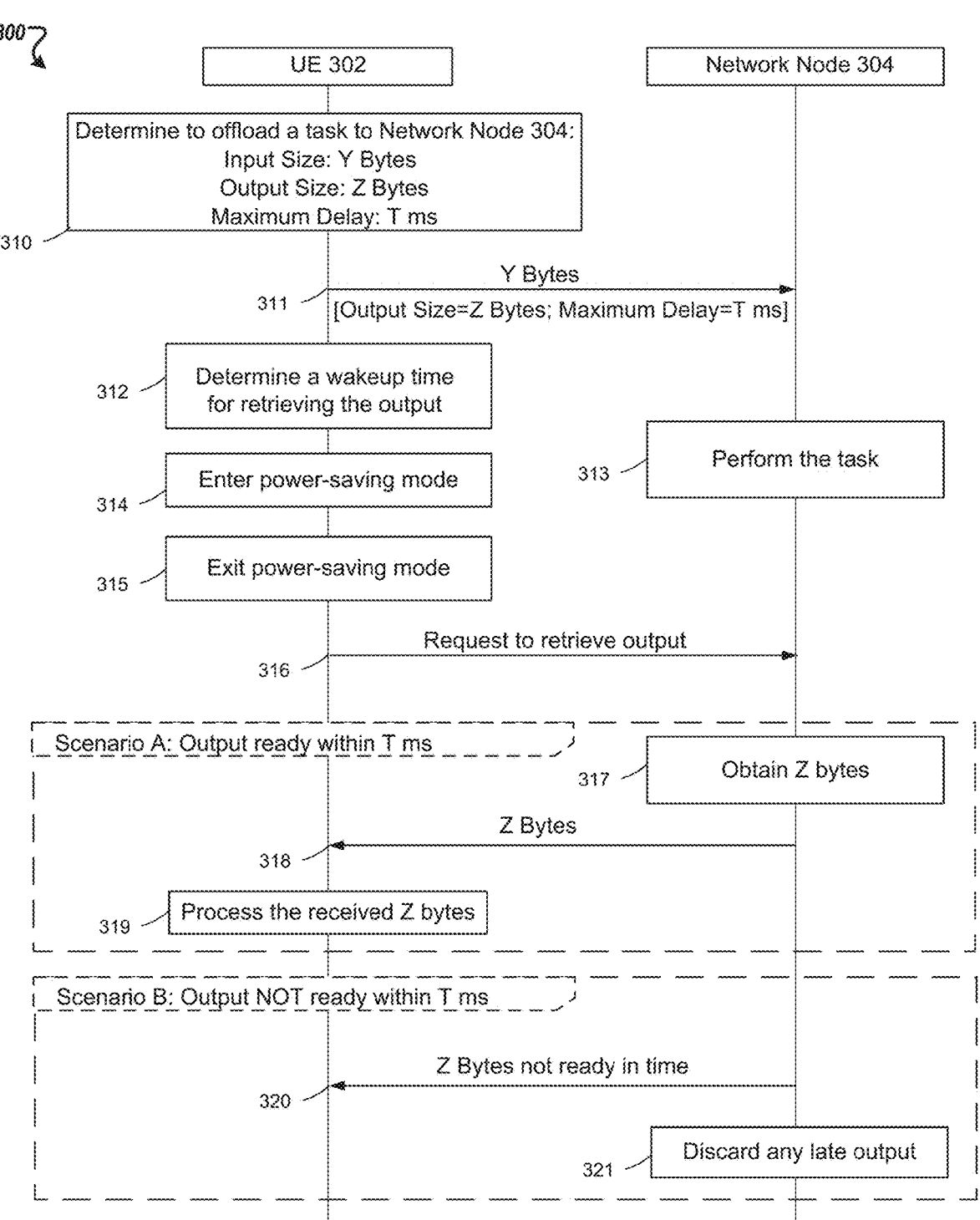
FIG. 3 illustrates a communications flow of distributed computing, according to some implementations.

FIG. 3 illustrates a communications flow 300 of distributed computing, according to some implementations. In FIG. 3, UE 302 and network node 304 can be similar to UE 102 and base station 104, respectively, of FIG. 1, and can be similar to UE 202 and network node 204, respectively, of FIGS. 2A-2C.

In communications flow 300, 310-315 can be similar to 230-235 of communications flow 200B of FIG. 2B. In these operations, UE 302 sends an offload request to network node 304, determines a wakeup time, and enters the power-saving mode until the wakeup time. Meanwhile, network node 304 performs the task upon receiving the offload request.

At 316, after exiting the power-saving mode, UE 302 sends a request to network node 304 to retrieve ("pull") the output. The request can be transmitted via, e.g., a physical uplink control channel (PUCCH), a random access channel (RACH), or a MAC CE. UE 302 can further indicate a time window for network node 304 to transmit the output. Specifying a time window can help network node 304 manage wireless resources more efficiently. In addition, specifying a time window can further reduce the power that UE 302 spends on monitoring for the output.

Communications flow 300 also addresses two scenarios depending on whether network node 304 obtains the output in time. In Scenario A, network node 304 obtains the output in time as expected at 317. Therefore, network node 304 is able to provide the Z bytes of output to UE 302 at 318. In turn, UE 302 can process the received Z bytes output at 319, similarly to 220, 239, and 258, in FIGS. 2A-2C. It is noted that 317 may happen before or after 316. In other words, the request to retrieve the output may occur before or after network node 304 obtains the output.

In Scenario B, network node 304 does not timely obtain the output and thus cannot provide the output to UE 302 within the maximum delay T ms. Communications flow 300C can address this scenario similarly to Scenario B of communications flow 200A.

FIG. 4A illustrates a flowchart of an example method 400A, according to some implementations. For clarity of presentation, the description that follows generally describes method 400A in the context of the other figures in this description. For example, method 400A can be performed by UE 102 of FIG. 1, UE 202 of FIG. 2A-2C, or UE 302 of FIG. 3. It will be understood that method 400A can be performed, for example, by any suitable system, environment, software, hardware, or a combination of systems, environments, software, and hardware, as appropriate. In some implementations, various steps of method 400A can be run in parallel, in combination, in loops, or in any order.

At 402, method 400A involves determining to offload a task to a network node. The determination can be similar to 210, 230, 250, or 310, as described previously with reference to FIGS. 2A-3.

At 404, method 400A involves transmitting an offload request to the network node based on the determining to offload the task, wherein the offload request includes a size of an expected response and a latest receipt time. The transmission can be similar to 211, 231, 251, or 311, as described previously with reference to FIGS. 2A-3.

At 406, method 400A involves determining a wakeup time based at least on the latest receipt time. For example, the wakeup time can be determined to be earlier than the latest receipt time. The determination can be based on, e.g., the nature and complexity of the task, available computation resources, or any PDSCH occasions agreed on during pre-configuration.

At 408, method 400A involves entering a power-saving mode until the wakeup time. The entry of the power-saving mode can be similar to 214, 234, 252, or 314, as described previously with reference to FIGS. 2A-3.

At 410, method 400A involves exiting the power-saving mode at the wakeup time. The exit of the power-saving mode can be similar to 215, 235, 253, or 315, as described previously with reference to FIGS. 2A-3.

At 412, method 400A involves monitoring a communication channel for the expected response from the network node until the latest receipt time. The monitoring can include monitoring for the scheduling of the downlink transmission in cases of, e.g., dynamic scheduling. The monitoring can also include monitoring for transport blocks containing the output data in cases of, e.g., configured scheduling.

Figure 4B:
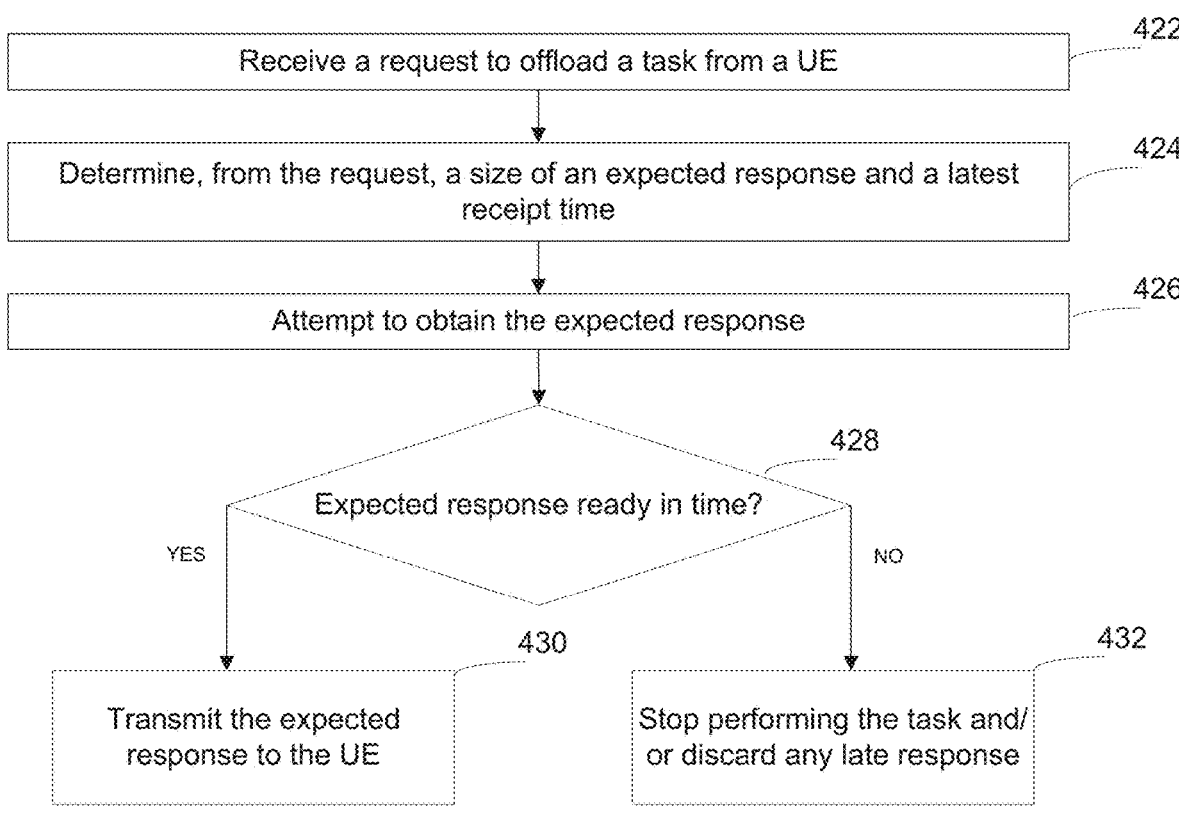

FIG. 4B illustrates a flowchart of an example method 400B, according to some implementations. For clarity of presentation, the description that follows generally describes method 400B in the context of the other figures in this description. For example, method 400B can be performed by base station 104 of FIG. 1, network node 204 of FIGS. 2A-2C, or network node 304 of FIG. 3. It will be understood that method 400B can be performed, for example, by any suitable system, environment, software, hardware, or a combination of systems, environments, software, and hardware, as appropriate. In some implementations, various steps of method 400B can be run in parallel, in combination, in loops, or in any order.

At 422, method 400B involves receiving a request to offload a task from a UE to the network node. The request can be similar to the offload request described previously with reference to FIGS. 2A-3.

At 424, method 400B involves determining a size of an expected response and a latest receipt time from the request. The expected response can include the output of the task. The size and the latest receipt time can be determined by the UE, similar to 210, 230, 250, or 310, as described previously with reference to FIGS. 2A-3.

At 426, method 400B involves attempting to obtain the expected response. For example, the network node can perform the task, either on its own or by outsourcing the task to another computing device. In some implementations, the attempt to obtain the expected response includes scheduling a transmission of the output with the UE.

At 428, method 400B involves determining whether the expected response is ready in time. To make the determination, the network node can set a timer according to the latest receipt time. If the network node has obtained the output before the timer lapse, then the network node determines the expected response is ready in time and proceeds to 430. Otherwise, the network node determines the expected response is not ready in time and proceeds to 432

At 430, method 400B involves transmitting the expected response to the UE. The transmission can be at a time dynamically scheduled with the UE or at a pre-configured PDSCH occasion. Alternatively or additionally, the transmission can occur upon receiving a request to retrieve the output from the UE.

At 432, method 400B involves stop performing the task and/or discarding any response that the network node obtains after the lapse of the latest receipt time. In some implementations, the network node can inform the UE of the failure to timely obtain the output.

In implementations described above, because the UE does not need to continuously monitor the communications channel while the network node performs the task, the UE can spend a considerable amount of time in the power-saving mode with certain wireless communication functions turned off. This can save power in distributed computing, especially when the time for performing the task and obtaining the result is long.

Figure 5:
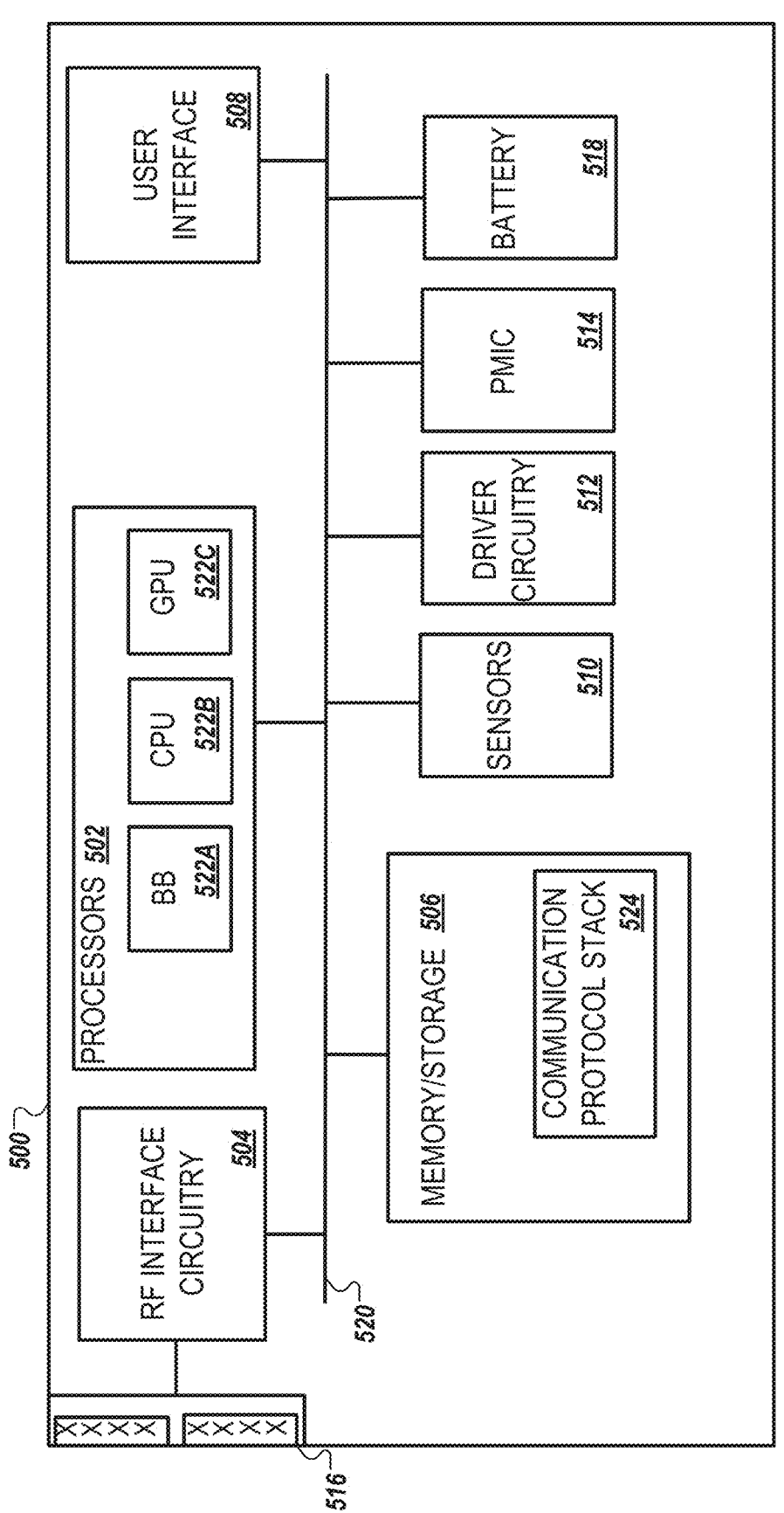
FIG. 5 illustrates a UE, according to some implementations.

FIG. 5 illustrates a UE 500, according to some implementations. The UE 500 may be similar to and substantially interchangeable with UE 102 of FIG. 1.

The UE 500 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 500 may include processors 502, RF interface circuitry 504, memory/storage 506, user interface 508, sensors 510, driver circuitry 512, power management integrated circuit (PMIC) 514, one or more antenna(s) 516, and battery 518. The components of the UE 500 may be implemented as integrated circuits (ICs), portions thereof, discrete electronic devices, or other modules, logic, hardware, software, firmware, or a combination thereof. The block diagram of FIG. 5 is intended to show a high-level view of some of the components of the UE 500. However, some of the components shown may be omitted, additional components may be present, and different arrangement of the components shown may occur in other implementations.

The components of the UE 500 may be coupled with various other components over one or more interconnects 520, which may represent any type of interface, input/output, bus (local, system, or expansion), transmission line, trace, optical connection, etc. that allows various circuit components (on common or different chips or chipsets) to interact with one another.

The processors 502 may include processor circuitry such as, for example, baseband processor circuitry (BB) 522A, central processor unit circuitry (CPU) 522B, and graphics processor unit circuitry (GPU) 522C. The processors 502 may include any type of circuitry or processor circuitry that executes or otherwise operates computer-executable instructions, such as program code, software modules, or functional processes from memory/storage 506 to cause the UE 500 to perform operations as described herein.

In some implementations, the baseband processor circuitry 522A may access a communication protocol stack 524 in the memory/storage 506 to communicate over a 3GPP compatible network. In general, the baseband processor circuitry 522A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 504. The baseband processor circuitry 522A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 506 may include one or more non-transitory, computer-readable media that includes instructions (for example, communication protocol stack 524) that may be executed by one or more of the processors 502 to cause the UE 500 to perform various operations described herein. The memory/storage 506 include any type of volatile or non-volatile memory that may be distributed throughout the UE 500. In some implementations, some of the memory/storage 506 may be located on the processors 502 themselves (for example, L1 and L2 cache), while other memory/storage 506 is external to the processors 502 but accessible thereto via a memory interface. The memory/storage 506 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 504 may include transceiver circuitry and radio frequency front module (RFEM) that allows the UE 500 to communicate with other devices over a radio access network. The RF interface circuitry 504 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna(s) 516 and proceed to filter and amplify (with a low-noise amplifier) the signal. The signal may be provided to a receiver of the transceiver that downconverts the RF signal into a baseband signal that is provided to the baseband processor of the processors 502.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna(s) 516. In various implementations, the RF interface circuitry 504 may be configured to transmit/receive signals in a manner compatible with NR access technologies.

The antenna(s) 516 may include one or more antenna elements to convert electrical signals into radio waves to travel through the air and to convert received radio waves into electrical signals. The antenna elements may be arranged into one or more antenna panels. The antenna(s) 516 may have antenna panels that are omnidirectional, directional, or a combination thereof to enable beamforming and multiple input, multiple output communications. The antenna(s) 516 may include microstrip antennas, printed antennas fabricated on the surface of one or more printed circuit boards, patch antennas, phased array antennas, etc. The antenna(s) 516 may have one or more panels designed for specific frequency bands including bands in FR1 or FR2.

The user interface 508 includes various input/output (I/O) devices designed to enable user interaction with the UE 500. The user interface 508 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 500.

The sensors 510 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nano-electromechanical systems including 3-axis accelerometers, 3-axis gyroscopes, or magnetometers; level sensors; temperature sensors (for example, thermistors); pressure sensors; image capture devices (for example, cameras or lens-less apertures); light detection and ranging sensors; proximity sensors (for example, infrared radiation detector and the like); depth sensors; ambient light sensors; ultra-sonic transceivers; microphones or other like audio capture devices; etc.

The driver circuitry 512 may include software and hardware elements that operate to control particular devices that are embedded in the UE 500, attached to the UE 500, or otherwise communicatively coupled with the UE 500. The driver circuitry 512 may include individual drivers allowing other components to interact with or control various input/output (I/O) devices that may be present within, or connected to, the UE 500. For example, driver circuitry 512 may include a display driver to control and allow access to a display device, a touchscreen driver to control and allow access to a touchscreen interface, sensor drivers to obtain sensor readings of sensors 510 and control and allow access to sensors 510, drivers to obtain actuator positions of electro-mechanic components or control and allow access to the electro-mechanic components, a camera driver to control and allow access to an embedded image capture device, audio drivers to control and allow access to one or more audio devices.

The PMIC 514 may manage power provided to various components of the UE 500. In particular, with respect to the processors 502, the PMIC 514 may control power-source selection, voltage scaling, battery charging, or DC-to-DC conversion.

In some implementations, the PMIC 514 may control, or otherwise be part of, various power saving mechanisms of the UE 500. A battery 518 may power the UE 500, although in some examples the UE 500 may be mounted deployed in a fixed location, and may have a power supply coupled to an electrical grid. The battery 518 may be a lithium ion battery, a metal-air battery, such as a zinc-air battery, an aluminum-air battery, a lithium-air battery, and the like. In some implementations, such as in vehicle-based applications, the battery 518 may be a typical lead-acid automotive battery.

Figure 6:
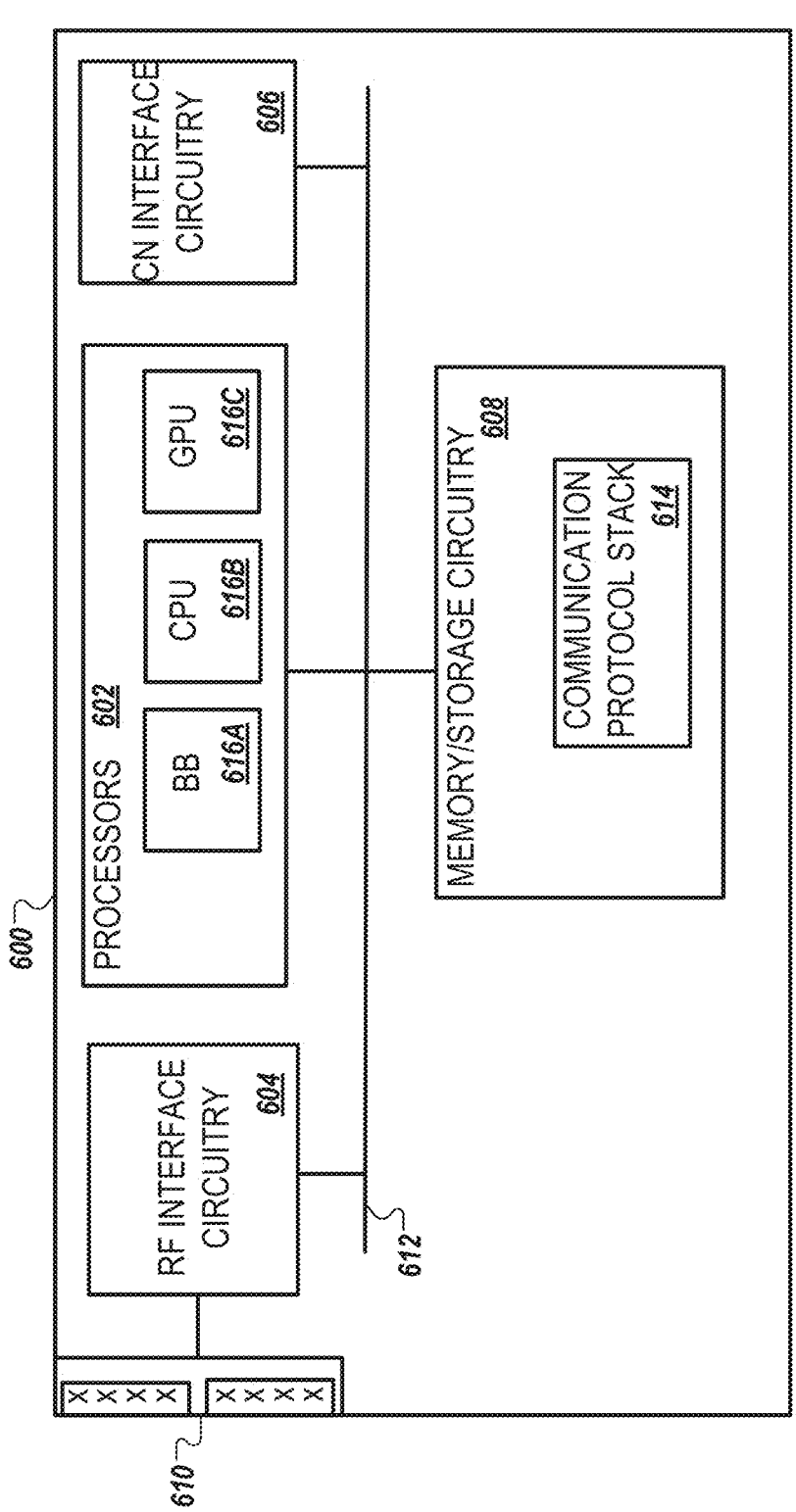
FIG. 6 illustrates an access node, according to some implementations.

FIG. 6 illustrates an access node 600 (e.g., a base station or gNB), according to some implementations. The access node 600 may be similar to and substantially interchangeable with base station 104. The access node 600 may include processors 602, RF interface circuitry 604, core network (CN) interface circuitry 606, memory/storage circuitry 608, and one or more antenna(s) 610.

The components of the access node 600 may be coupled with various other components over one or more interconnects 612. The processors 602, RF interface circuitry 604, memory/storage circuitry 608 (including communication protocol stack 614), antenna(s) 610, and interconnects 612 may be similar to like-named elements shown and described with respect to FIG. 5. For example, the processors 602 may include processor circuitry such as, for example, baseband processor circuitry (BB) 616A, central processor unit circuitry (CPU) 616B, and graphics processor unit circuitry (GPU) 616C.

The CN interface circuitry 606 may provide connectivity to a core network, for example, a 5th Generation Core network (5GC) using a 5GC-compatible network interface protocol such as carrier Ethernet protocols, or some other suitable protocol. Network connectivity may be provided to/from the access node 600 via a fiber optic or wireless backhaul. The CN interface circuitry 606 may include one or more dedicated processors or FPGAs to communicate using one or more of the aforementioned protocols. In some implementations, the CN interface circuitry 606 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 600 that operates in an NR or 5G system (for example, a gNB), and the term "E-UTRAN node" or the like may refer to an access node 600 that operates in an LTE or 4G system (e.g., an eNB). According to various implementations, the access node 600 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 600 may be implemented as one or more software entities running on server computers as part of a virtual network, which may be referred to as a CRAN and/or a virtual baseband unit pool (vBBUP). In V2X scenarios, the access node 600 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Any of the above-described examples may be combined with any other example (or combination of examples), unless explicitly stated otherwise. The foregoing description of one or more implementations provides illustration and description, but is not intended to be exhaustive or to limit the scope of implementations to the precise form disclosed. Modifications and variations are possible in light of the above teachings or may be acquired from practice of various implementations.

Although the implementations above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A processor comprising circuitry that executes instructions to cause a user equipment (UE) to perform operations comprising:

determining to offload a task to a network node;
   transmitting an offload request to the network node based on the determining to offload the task, wherein the offload request comprises a size of an expected response and a latest receipt time;
   determining a wakeup time based at least in part on the latest receipt time;
   entering a power-saving mode until the wakeup time;
   exiting the power-saving mode at the wakeup time; and
   monitoring a communication channel for the expected response from the network node until the latest receipt time.

2. The processor of claim 1, wherein determining the wakeup time comprises:

prior to entering the power-saving mode, receiving a scheduling signal from the network node, wherein the scheduling signal indicates an expected time for the network node to transmit the expected response; and
   determining the wakeup time based at least on the expected time.

3. The processor of claim 1, wherein determining the wakeup time comprises:
      estimating an expected time for the network node to transmit the expected response; and
      determining the wakeup time based at least on the expected time, and
   wherein monitoring the communication channel for the expected response comprises:
      transmitting a request for the expected response to the network node.

4. The processor of claim 1, wherein the offload request comprises a medium access control (MAC) control element (CE).

5. The processor of claim 1, the operations further comprising:

transmitting, via radio resource control (RRC) signaling, a list of multiple tasks,
   wherein the offload request further comprises an identifier that identifies the task from the list.

6. The processor of claim 5, wherein the task is a first task, and the operations further comprise:

determining to offload a second task in the list to the network node; and
   multiplexing the offloading of the first task and the offloading of the second task in a frequency domain or in a time domain.

7. The processor of claim 1, the operations further comprising:

receiving the expected response from the network node; and
   executing an application using the expected response.

8. The processor of claim 1, wherein the UE is configured to not monitor the communication channel while in the power-saving mode.

9. A user equipment (UE), comprising: a processor; and a transceiver coupled to the processor, wherein the processor is configured to:
      generate an offload request to a network node after determining to offload a task to the network node, wherein the offload request comprises: a size of an expected response and a latest receipt time for the expected response,
      determine a wakeup time based at least on the latest receipt time,
      enter a power-saving mode until the wakeup time,
      exit the power-saving mode at the wakeup time, and
      control the transceiver to monitor a communication channel for the expected response from the network node until the latest receipt time, and
   wherein the transceiver is configured to transmit the offload request to the network node.

10. The UE of claim 9, wherein the transceiver receives, prior to the processor entering the power-saving mode, a scheduling signal from the network node,
   wherein the scheduling signal indicates an expected time for the network node to transmit the expected response, and
   wherein the processor determines the wakeup time based at least on the expected time.

11. The UE of claim 9, wherein the processor estimates an expected time for the network node to transmit the expected response,
   wherein the processor determines the wakeup time based at least on the expected time, and
   wherein the transceiver transmits to the network node a request for the expected response.

12. The UE of claim 9, wherein the offload request comprises a medium access control (MAC) control element (CE).

13. The UE of claim 9, wherein the transceiver transmits, via radio resource control (RRC) signaling, a list of multiple tasks, and
   wherein the offload request further comprises an identifier that identifies the task from the list.

14. The UE of claim 13, wherein the processor further determines to offload a second task in the list to the network node, and
   wherein the processor multiplexes the offloading of the task and the offloading of the second task in a frequency domain or in a time domain.

15. The UE of claim 9, wherein the transceiver is configured to not monitor the communication channel while in the power-saving mode.

16. A method, comprising: by a user equipment (UE), determining to offload a task to a network node;
   transmitting an offload request to the network node based on the determination to offload the task, wherein the offload request comprises a size of an expected response and a latest receipt time;
   determining a wakeup time based at least in part on the latest receipt time;
   entering a power-saving mode until the wakeup time;
   exiting the power-saving mode at the wakeup time; and
   monitoring a communication channel for the expected response from the network node until the latest receipt time.

17. The method of claim 16, further comprising: entering the power-saving mode upon detecting that the latest receipt time has passed.

18. The method of claim 16, wherein the offload request further comprises a number of hybrid automatic repeat request (HARQ) retransmissions, and wherein the method further comprises: before the latest receipt time, receiving the expected response from the network node via the number of HARQ retransmissions.

19. The method of claim 16, further comprising: receiving the expected response using a downlink resource determined by configured scheduling.

20. The method of claim 16, further comprising: receiving the expected response using a downlink resource determined by dynamic scheduling.

\* \* \* \* \*